Nov. 15, 1938.   J. J. BLANC   2,136,875
DEVICE FOR SECURING TOGETHER ARTICLES SUCH AS PLATES OR THE LIKE
Original Filed March 16, 1936

JEAN J. BLANC
INVENTOR

BY

ATTORNEY

Patented Nov. 15, 1938

2,136,875

UNITED STATES PATENT OFFICE 2,136,875

DEVICE FOR SECURING TOGETHER ARTICLES SUCH AS PLATES OR THE LIKE

Jean J. Blanc, Courbevoie, France

Application March 16, 1936, Serial No. 69,019. Renewed August 24, 1938. In France May 13, 1935

10 Claims. (Cl. 85—5)

This invention relates to devices for securing together articles such as plates or the like, preparatory to the riveting thereof.

Heretofore, it has been found in practice that before plates or the like could be riveted together, it was necessary for the workman to first secure the plates together by screws or bolts, which were inserted in the holes provided to receive the rivets. This long and expensive operation was necessary not only to secure the plates together but also to assure a perfect coaxial alignment of the rivet holes. In a great number of cases, this operation necessitated two workmen, one on one side of the work for inserting and holding the bolt in place, and the other on the other side of the work for screwing and tightening the nut on the bolt. It is therefore an object of this invention to produce a plate securing and locating device which is applied to or removed from the work from only one side thereof, thus eliminating the assistance of another workman from the opposite side of the work.

Another object of this invention is to produce a device which is capable of securing plates together, as well as assuring the perfect alignment of the rivet holes provided through the plates.

Another object of this invention is to produce a device with which plates or other articles which are to be riveted together, may easily and rapidly be united preparatory to the riveting operation.

Another object of this invention is to produce a device for securing and locating plates or other articles together, which is simple in construction and affording an assembly which is compact, durable and efficient.

Other objects more or less ancillary to the foregoing reside in the specific construction and aggroupment of the elements peculiar to this structure, as will become apparent from a more complete examination of this specification.

Referring to the drawing which illustrates the invention:

Figure 1:
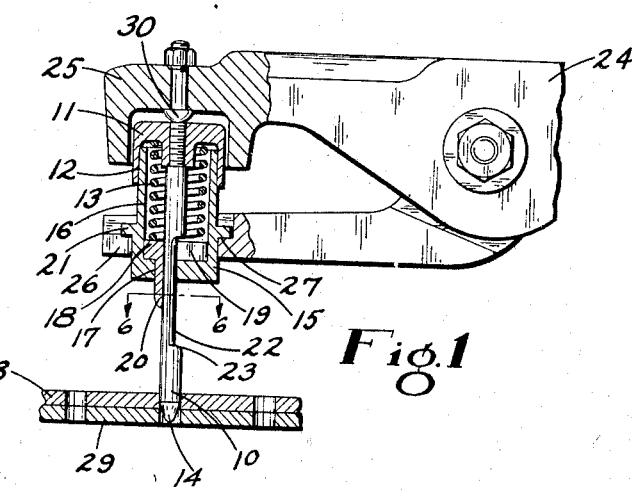
Fig. 1 is an elevational view partly in section of the device together with a portion of the tool with which the device is applied to or removed from the work. In this view, the device is shown in the position assumed during the first step of its application to the work.

Referring to this illustrative construction, 10 represents a pin or elongated element which has the upper end thereof threaded to receive a head 11. The head 11 is provided with an annular recess 12 adapted to receive one end of a compression spring 13 which surrounds the pin. The other end of the pin is pointed as at 14 for facilitating the insertion of the pin through the work. The tension of the spring may be regulated by varying the position of the head 11 upon the threaded upper end of the pin.

Slidably mounted on the pin 10, there is a cap or jaw 15 provided with an enlarged counterbore 16 centrally disposed therein and with an eccentric bore 17 of a diameter substantially equal to the normal diameter of the pin 10. In the counterbore 16 there is located, in engagement with the bottom wall thereof, a washer 18 having a radially disposed slot 19 extending somewhat beyond the center of the washer, and of a width substantially equal to the normal diameter of the pin 10. The washer 18 is also formed with a stem 20 depending therefrom and extending through the bore 17 of the cap 15. On this washer is seated the other end of the compression spring 13. The upper external end portion of the cap 15 is provided with an annular bead 21, the purpose of which will be explained later.

Figure 6:
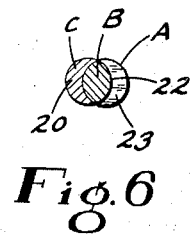
Fig. 6 is an enlarged cross sectional view taken in a plane indicated by line 6—6 in Fig. 1.
Figure 5:
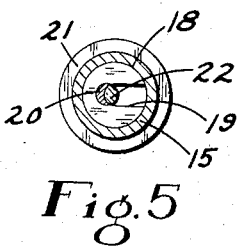
Fig. 5 is a cross sectional view taken in a plane indicated by line 5—5 in Fig. 2.

As previously stated, the pin 10 is made of cylindrical stock the cross section of which defines a circle mark "A" in Fig. 6. For a portion of its length between the ends thereof, the pin 10 is eccentrically turned down or otherwise machined to form a reduced portion 22 slidable through the bore 17 of the cap 15. The cross section of this reduced portion of the pin is shaped as indicated by "B" in Fig. 6. The forward end of the reduced portion of the pin produces with the normal forward portion thereof a bevelled shoulder 23 which is capable of engagement with the work as will be explained later.

The stem 20 depending from the washer 18, is first turned cylindrical to a diameter equal to that of the normal diameter of the pin 10, and subsequently is milled with an arcuated cutter used to cut the slot 19 in the washer 18, thus producing a stem cross section shaped as indicated by "C" in Fig. 6. This last cross section together with the cross section "B" of the reduced portion of the pin, defines a perfect circular cross section identical to that of the normal cross section of the pin 10.

The projection carried by the rod or pin should be maintained in substantially fixed relation to the finger. For the purpose of accomplishing this desideratum the pin or rod is arranged substantially non-rotatable with respect to the finger. In the specific embodiment of the invention illustrated, the reduced portion 22 is substantially non-circular (having cross-section B) and is bounded on one side by the inside milled surface of the finger 20 and on the other side by a portion of the eccentric bore 17. It will be readily seen that the rod or pin is substantially laterally non-movable whereby the substantial non-rotatability is assured. It is of course understood that other means, well known in the art, than those achieving substantial lateral non-movability may be used for accomplishing the desired non-rotatability of the pin or rod with respect to the finger. As illustrated in the drawing the arrangement of the structural elements in accordance with the invention will not interfere with the reciprocal sliding of the pin relative to the other parts but insures that the pin or rod is always in proper alignment and position, thereby eliminating the necessity for any special adjustment or manipulations.

Used in connection with the device above described, there is provided a plier like tool 24 comprising a duality of movable jaws 25 and 26. The jaw 25 is formed with a cavity corresponding in shape to the head 11, and adapted to receive the same. To the bottom of this cavity is affixed the arcuated head 30 of a bolt, which is engageable with the head 11 in a manner permitting the rocking movement of the former relative to the jaw 25. The jaw 26 is open to form a U shaped jaw provided with a partly annular shoulder 27 engageable with the ridge 21 of the cap 15.

Figure 3:
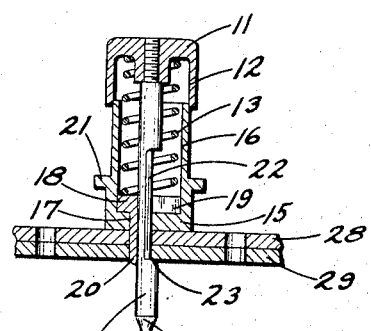
Fig. 3 is also a view similar to Fig. 1, showing the device in operative position.
Figure 2:
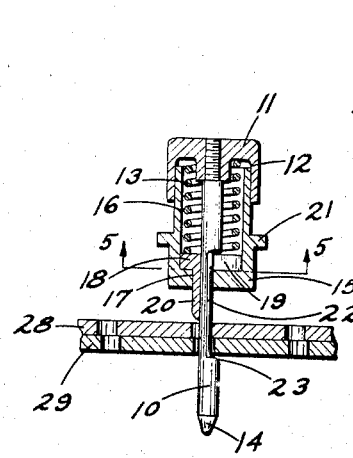
Fig. 2 is a view similar to Fig. 1, illustrating another position assumed by the device when applied or removed from the work, the portion of tool shown in Fig. 1, being omitted in Fig. 2.
Figure 4:
Fig. 4 is a reduced view of the complete tool together with the device shown in a position similar to that shown in Fig. 1.

Referring to the operation of the device, let us assume that the work to be riveted consists of two plates 28 and 29, and that the device is positioned between the jaws of the tool 24 in the manner shown in Fig. 1. By manual pressure exerted on the hand grips of the tool, the jaws thereof are moved toward each other to compress the spring 13 and thereby cause the cap 15 to slide on the pin 10 toward the head 11. Thereafter, the pointed end 14 of the pin 10 may be introduced through a hole formed in the plates 28 and 29, until the shoulder 23 has passed through the plates. Subsequently the device is moved laterally to position the shoulder 23 under the plate 29 as shown in Fig. 2. By releasing the pressure exerted on the hand grips of the tool 24, the compression spring 13 will cause the cap 15 together with the washer 18 mounted therein to move toward the plate 28, thus forcing the penetration of the stem 20 alongside of the reduced portion 22 of the pin 10 in the holes formed through the plates 28 and 29. Since the cross section "C" of this stem together with the cross section "B" of the pin forms a cross section substantially equal to that of the holes, it will be understood that due to the cooperation of the stem 20 with the reduced portion 22 of the pin 10, the plates 28 and 29 are maintained in a manner affording the perfect coaxial alignment of the holes formed therethrough, thus facilitating the introduction of the rivets preparatory to the riveting operation. Upon further release of the pressure exerted on the handle grips of the tool 24, the cap or jaw 15 will finally come in engagement with the plate 26, causing thereby the plates to be clamped together between the shoulder 23 of the pin 10 and the cap 15 in the manner illustrated in Fig. 3. Thereafter the tool 24 may be removed from the device, and the latter left in clamping engagement with the plates preparatory to the riveting operation.

From the foregoing it will be understood that with the device above described applied to the work in sufficient quantity, the plates or other articles to be riveted together will be secured against each other with the rivet holes formed therethrough in perfect coaxial alignment. After the plates have been riveted sufficiently to hold them together against relative movement, the devices applied to the work may be removed by first sliding the open end jaw 26 of the tool 24 under the bead 21 of the cap 15, and causing the movement of the jaws toward each other to compress the spring 13. During the upward movement of the cap 15, the stem 20 is moved on the reduced portion 22 of the pin 10 away from the work, thus permitting the device to be moved laterally to position the front end of the pin 10 in coaxial alignment with the hole formed through the plates and permitting thereby the withdrawal of the device from the work. When the tool 24 is finally removed from the device, the cap 15, due to the effort of the compression spring 13, is forced downwardly on the pin 10 until it engages the shoulder 23 formed on the latter, where it remains due to the relatively slight pressure still exerted by the spring 13.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:

1. A temporary rivet comprising a rod, a projection extending transversely from the first end of said rod, a projecting member extending transversely from said rod and slidable with respect thereto at least substantially up to said projection, a finger carried by said member extending therefrom along said rod toward the first end of said rod, said rod being substantially non-rotatable with respect to said finger, a spring positioned and of a force sufficient to securely hold together in the bite defined by said projection and said member, at least two perforated metal plates in perforate alignment.

2. A temporary rivet according to claim 1 in which the end of said finger is tapered.

3. A temporary rivet comprising a rod, a projection extending transversely from the first end of said rod, a projecting member extending transversely from said rod and slidable with respect thereto at least substantially up to said projection, a finger of uniform cross-section carried by said member extending therefrom along said rod toward said first end, said rod being substantially non-rotatable with respect to said finger, a spring positioned and of a force sufficient to securely hold together in the bite defined by said projection and said member at least two perforated metal plates in perforate alignment.

4. A temporary rivet according to claim 3 in which the end of said finger is tapered.

5. A temporary rivet comprising a rod, a projection extending transversely from the first end of said rod, a projecting member extending transversely from said rod and slidable with respect thereto at least substantially up to said projection, a finger carried by said member extending therefrom along said rod toward the first end of said rod, said finger and the adjacent section of said rod collectively defining a cylinder, said rod being substantially non-rotatable with respect to said finger, a spring positioned and of a force sufficient to securely hold together in the bite defined by said projection and said member at least two perforated metal plates in perforate alignment.

6. A temporary rivet according to claim 5 in which the end of said finger is tapered.

7. A temporary rivet comprising a rod, a projection extending transversely from the first end of said rod, a projecting member extending transversely from said rod and slidable with respect thereto at least substantially up to said projection, a finger carried by said member extending therefrom along said rod toward the first end of said rod, said rod being substantially non-rotatable with respect to said finger, and means for bringing said projection and said member in clamping position with sufficient force to securely hold together in the bite defined by said projection and said member, at least two perforated metal plates in perforate alignment.

8. A temporary rivet according to claim 7 in which the end of said finger is tapered.

9. A temporary rivet comprising a rod, a projection extending transversely from the first end of said rod, a projecting member extending transversely from said rod and slidable with respect thereto, a finger carried by said member extending therefrom along said rod toward the first end thereof, said rod being substantially non-rotatable with respect to said finger, and means for bringing said projection and said member into clamping position with sufficient force to securely hold together in the bite defined by said projection and said member at least two perforated metal plates in perforate alignment.

10. A temporary rivet comprising a rod, a projection extending transversely from the first end of said rod, a collar encircling said rod and slidable with respect thereto at least substantially up to said projection, a finger carried by said collar extending therefrom along said rod toward the first end thereof, said rod having a non-circular cross-section intermediate the ends thereof and being substantially non-rotatable and substantially laterally non-movable with respect to said finger, a spring positioned and of a force sufficient to securely hold together in the bite defined by said projection and said collar at least two perforated metal plates in perforate alignment.

JEAN J. BLANC.